United States Patent
Lingafelt et al.

(10) Patent No.: US 9,350,754 B2
(45) Date of Patent: May 24, 2016

(54) MITIGATING A CYBER-SECURITY ATTACK BY CHANGING A NETWORK ADDRESS OF A SYSTEM UNDER ATTACK

(71) Applicant: Lenovo Enterprise Solutions (Singapore) PTE. LTD., Singapore (SG)

(72) Inventors: Charles Steven Lingafelt, Durham, NC (US); James W. Murray, Durham, NC (US); James T. Swantek, Canton, GA (US); James S. Worley, Raleigh, NC (US)

(73) Assignee: LENOVO ENTERPRISE SOLUTIONS (SINGAPORE) PTE. LTD., Serangoon Garden (SG)

( * ) Notice: Subject to any disclaimer, the term of this patent is extended or adjusted under 35 U.S.C. 154(b) by 263 days.

(21) Appl. No.: 13/945,409

(22) Filed: Jul. 18, 2013

(65) Prior Publication Data

US 2015/0026806 A1 Jan. 22, 2015

(51) Int. Cl.
*G06F 21/00* (2013.01)
*H04L 29/06* (2006.01)
*H04L 29/12* (2006.01)

(52) U.S. Cl.
CPC ........ *H04L 63/1441* (2013.01); *H04L 61/2015* (2013.01); *H04L 61/2053* (2013.01)

(58) Field of Classification Search
CPC ....................................................... G06F 21/00
USPC ............................................................ 726/23
See application file for complete search history.

(56) References Cited

U.S. PATENT DOCUMENTS

| | | | |
|---|---|---|---|
| 8,245,294 B1 | 8/2012 | Zahra et al. | |
| 8,280,968 B1 | 10/2012 | Duan | |
| 2002/0161884 A1* | 10/2002 | Munger et al. | 709/224 |
| 2008/0059615 A1 | 3/2008 | Izutani | |
| 2010/0262703 A1* | 10/2010 | Faynberg | H04L 63/0815 709/229 |
| 2011/0161786 A1* | 6/2011 | Nishiyama | 714/776 |

* cited by examiner

*Primary Examiner* — Jacob Lipman
(74) *Attorney, Agent, or Firm* — Olive Law Group, PLLC (57) ABSTRACT

In response to determining that a computer is undergoing a cyber attack, a newly assigned IP address is received for the computer. A currently assigned IP address of the computer is changed to the newly assigned IP address.

24 Claims, 5 Drawing Sheets

MITIGATING A CYBER-SECURITY ATTACK BY CHANGING A NETWORK ADDRESS OF A SYSTEM UNDER ATTACK

FIELD OF INVENTION

The exemplary embodiments of this invention relate generally to computer network security and, more particularly, to systems, methods, and apparatuses for mitigating a cyber-security attack by changing a network address of a system under attack.

BACKGROUND

During routine operation of a first device on a network, the first device may be remotely attacked by a second device on the network. Methods of attack include the second device probing for the IP address and associated services of the first device to expose vulnerabilities. Other methods of attack include brute force attacks and denial of service attacks. A brute force attack is a trial-and-error method used to obtain information such as a user password or personal identification number (PIN). In a brute force attack, automated software is used to generate a large number of consecutive guesses as to the value of the desired data. Brute force attacks may be used by criminals to crack encrypted data, or by security analysts to test an organization's network security.

A denial-of-service (DoS) attack is an attempt to render a machine or network resource unavailable to its intended users. Although the means to carry out, motives for, and targets of a DoS attack may vary, these types of attacks generally comprise efforts to temporarily or indefinitely interrupt or suspend services of a host connected to a computer network such as the Internet. Perpetrators of DoS attacks typically target sites or services hosted on high-profile web servers such as banks, credit card payment gateways, and even root name servers. One common method of attack involves saturating the target device with external communication requests until the target device cannot respond to legitimate traffic, or until the target device responds so slowly as to be rendered essentially unavailable. Such attacks may lead to a server overload. DoS attacks may also be implemented by forcing the target device to reset, by consuming one or more resources of the target device so that the device can no longer provide its intended service, or obstructing a communications path between the intended users and the target device so that communication is no longer possible.

SUMMARY

In one exemplary aspect, a method comprises changing an IP address of a computer in response to determining that the computer is undergoing a cyber attack by receiving one or more newly assigned IP addresses for the computer.

In a further exemplary aspect, the method includes the computer performing a handshaking procedure with a network administrator node wherein the handshaking procedure includes detecting the cyber attack, sending a message to the network administrator node, and receiving the newly assigned IP address from a Dynamic Host Configuration Protocol server.

In a further exemplary aspect, upon receiving the newly assigned IP address, the computer transitions one or more applications resident on the computer to conform to the newly assigned IP address. This transition may, but need not, comprise terminating a currently assigned IP address that is to be replaced by the newly assigned IP address; and activating the newly assigned IP address. This transition may, but need not, comprise monitoring a rate of aggregate information flow by one or more applications on the computer using the currently assigned IP address; and, in response to the rate of aggregate information flow falling below a predetermined threshold rate of aggregate information flow, assigning the newly assigned IP address.

In a further exemplary aspect, the computer transition comprises the steps of: monitoring a rate of application flow for each of a plurality of individual applications using the currently assigned IP address by one or more applications running on the computer; upon a rate of information flow for one or more of the plurality of individual applications falling below a threshold rate, assigning the newly assigned IP address to the one or more of the plurality of individual applications. The newly assigned address may, but need not, conform to one or more of IPv4 and IP v6.

In a further exemplary aspect, selection of the newly assigned IP address is performed using a random selection process from a pool of available and least recently used IP addresses.

In a further exemplary aspect, attacks are detected and an intensity for each detected attack is measured by detecting a number of probing actions per unit time.

BRIEF DESCRIPTION OF THE SEVERAL VIEWS OF THE DRAWINGS

The foregoing and other aspects of exemplary embodiments are made more evident in the following Detailed Description, when read in conjunction with the attached Drawing Figures, wherein.

DETAILED DESCRIPTION

The exemplary embodiments disclosed herein are directed to systems, methods, and apparatuses for apparatuses for mitigating a cyber-security attack by changing the network address of the system under attack. As a preliminary matter, although this invention is not limited to Internet Protocol Version 6 (IPv6) implementations, IPv6 has a much greater number of available Internet Protocol (IP) addresses compared to Internet Protocol Version 4 (IPv4). This much larger address space results in more difficulties for potential attackers, as they now must find and probe or conduct DOS attacks against a much larger set of addresses. One set of illustrative embodiments of the invention takes advantage of the enormous increase in IP address space in IPv6 to change an IP address of a system under attack, thus frustrating and potentially eliminating the effect of the attack.

Figure 1:
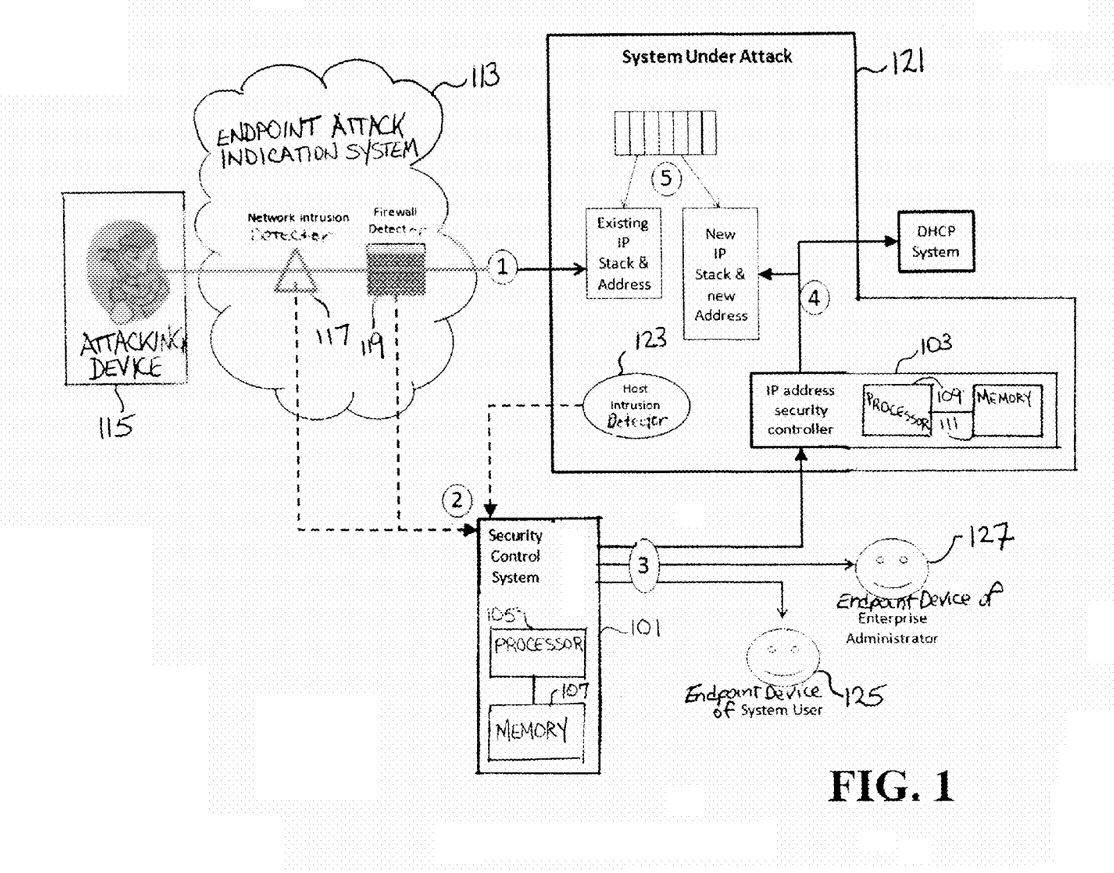
FIG. 1 is an information flow diagram illustrating the performance of a first exemplary set of methods on an exemplary system architecture.

FIG. 1 is a flow diagram that illustrates the operation of a first exemplary set of methods, and a result of execution of computer program instructions embodied on a computer readable memory, in accordance with various exemplary embodiments. The method is performed by a security control system 101, or by an IP address security controller 103, or by both the security control system 101 and the IP address security controller 103. The security control system 101 includes a processor 105 operatively coupled to a tangible computer readable storage medium such as a memory 107. Similarly, the IP address security controller 103 includes a processor 109 operatively coupled to a tangible computer readable storage medium such as a memory 111.

The security control system 101 is operatively coupled to an endpoint attack indication system 113. The endpoint attack indication system may include one or more attack detection mechanisms for detecting an attack launched by an attacking device 115 against a system under attack 121. For purposes of illustration, these attack detection mechanisms may, but need not, include a network intrusion detector 117 and a firewall detector 119. Some illustrative examples for implementing the network intrusion detector 117 include any of the systems in IBM's ISS IPS product line. The firewall detector 119 may be implemented, for example, using IBM's Managed and Monitored Firewall Service. As an alternative or addition to the endpoint attack indication system 113, an attack from attacking device 115 may be identified by equipping the system under attack 121 with a host intrusion detector 123, such as IBM's Managed Intrusion Prevention and Detection Service.

The information flow sequence of FIG. 1 commences at Step 1 where the system under attack 121 is attacked by the attacking device 115. Next, at Step 2, the endpoint attack indication system 113 alerts the security control system 101 that the system under attack 121 is currently under attack. At Step 3, in response to an attack intensity being greater than a predetermined threshold, the security control system 101 instructs the IP address security controller 103 to cause the system under attack 121 to switch IP addresses. The security control system 101 sends an alert to at least one of an endpoint device of a system user 125, or an endpoint device of an enterprise administrator 127, wherein the alert is indicative of the system under attack 121 being attacked.

At Step 4, the IP address security controller 103 causes a transition of applications (Step 5) from a currently assigned IP stack and address which is under attack to a newly assigned IP stack and address. The IP address security controller performs Steps 4 and 5 using any of the methods described hereinafter with reference to FIGS. 2-5. For purposes of illustration, the newly-assigned IP address may, but need not, be provided by a Dynamic Host Configuration Protocol (DHCP) system 133. The DHCP system 133 may comprise a server or a bank of servers that maintains a database of available IP addresses and configuration information.

The DHCP system 133 may receive an IP address allocation request from a client, such as the IP address security controller 103. In response to the request, the DHCP system 133 determines a network to which the DHCP client is connected, allocates an IP address or prefix that is appropriate for the client, and sends configuration information to the client that is appropriate for that client. The DHCP system 133 may, but need not, grant IP addresses to clients only for a limited interval of time. DHCP clients are responsible for renewing their IP addresses before that interval has expired. DHCP is used in IPv4 as well as IPv6, although the version of DCHP that is used in IPv4 differs somewhat from the version of DHCP that is used in IPv6. Alternatively, or additionally, IPv6 hosts may use stateless address autoconfiguration to obtain a newly assigned IP address. Alternatively, or additionally, IPv4 hosts may use link-local addressing to obtain a newly assigned IP address that is used to achieve limited local connectivity.

Given that an endpoint is determined to be under attack in response to an attack intensity exceeding a predetermined threshold that has been set to invoke a response, then any of the procedures described with reference to FIGS. 2-5 may be invoked to effect a change in IP address of an endpoint device from a currently assigned IP address to a newly assigned IP address. For illustrative purposes, this endpoint device may be an endpoint device of system user 125 (FIG. 1) or an endpoint device of enterprise administrator 127.

The endpoint attack indication system 113 may be implemented using any method, apparatus, computer program, or system that is configured for indicating that an endpoint device is under attack. Examples of such methods include, but are not limited to host based intrusion detection, network-based intrusion detection, boundary device detection, or external-to-organization security attack intelligence information. Host-based intrusion detection uses a monitoring program, running on the endpoint device itself (such as the endpoint device of system user 125, or the endpoint device of enterprise administrator 127), that conducts observations of any foreign entities attempting to compromise the endpoint device. Network-based intrusion detection uses a monitoring program, running within a network to which one or more endpoint devices are connected, that conducts observations to identify whether network traffic destined for a particular IP address associated with a specific endpoint device is traffic that is of an attacking nature. Boundary device detection uses a monitoring component in a boundary mechanism, such as a firewall, to observe traffic destined for a specific endpoint, and to identify any such traffic that is suspected to be malicious. External-to-organization security attack intelligent information refers to information gathered from outside an organization that indicates an endpoint is under attack. This information may come, for example, from service providers or governmental organizations).

Illustrative examples of network-based intrusion detection systems include, but are not limited to, any system within IBM's ISS IPS product line. Illustrative examples of boundary device detection systems include, but are not limited to IBM's Managed and Monitored Firewall Service. Illustrative examples of host-based intrusion detection systems include IBM's Managed Intrusion Prevention and Detection Service. Any of the foregoing systems are configured to observe and quantify an intensity of an attack from an attacking device 115 using an endpoint attack indicator such as, for example, a number or quantity of attacks per second. Additionally or alternatively, an endpoint attack indicator threshold may be defined as a value, set at the endpoint device of enterprise administer 127, above which an action is taken, such as changing the currently assigned IP address to a newly assigned IP address.

The endpoint device of enterprise administrator 127 may be used by one or more members of information technology (IT) administration. IT administration refers to a group which provides IT services to an organization and which would have a desire to know when an endpoint device is under attack. In some organizations, this group is known as the security operations center, in others it is known as the network operations center, and in others it is known as the incident response team. This is not an exhaustive list of organizations, and the name of the group is limited only by the imagination.

Although the set of embodiments described in conjunction with FIG. 1 changes an IP address from a currently assigned IP address to a newly assigned IP address in response to an attacking device 115, alternatively or additionally, the routing of data for the endpoint device of system user 125 may be changed. Alternatively or additionally, the currently assigned IP address under attack by the attacking device 115 may be moved to a second system that is external to the system under attack 121. This second system may, but need not, be configured to capture forensic information about the attack, so as to enable the authorities to track down and pursue the attacking device 115.

The selection of which embodiment to use is dependent on the nature of the Enterprise and the nature of the system under attack.

Figure 2:
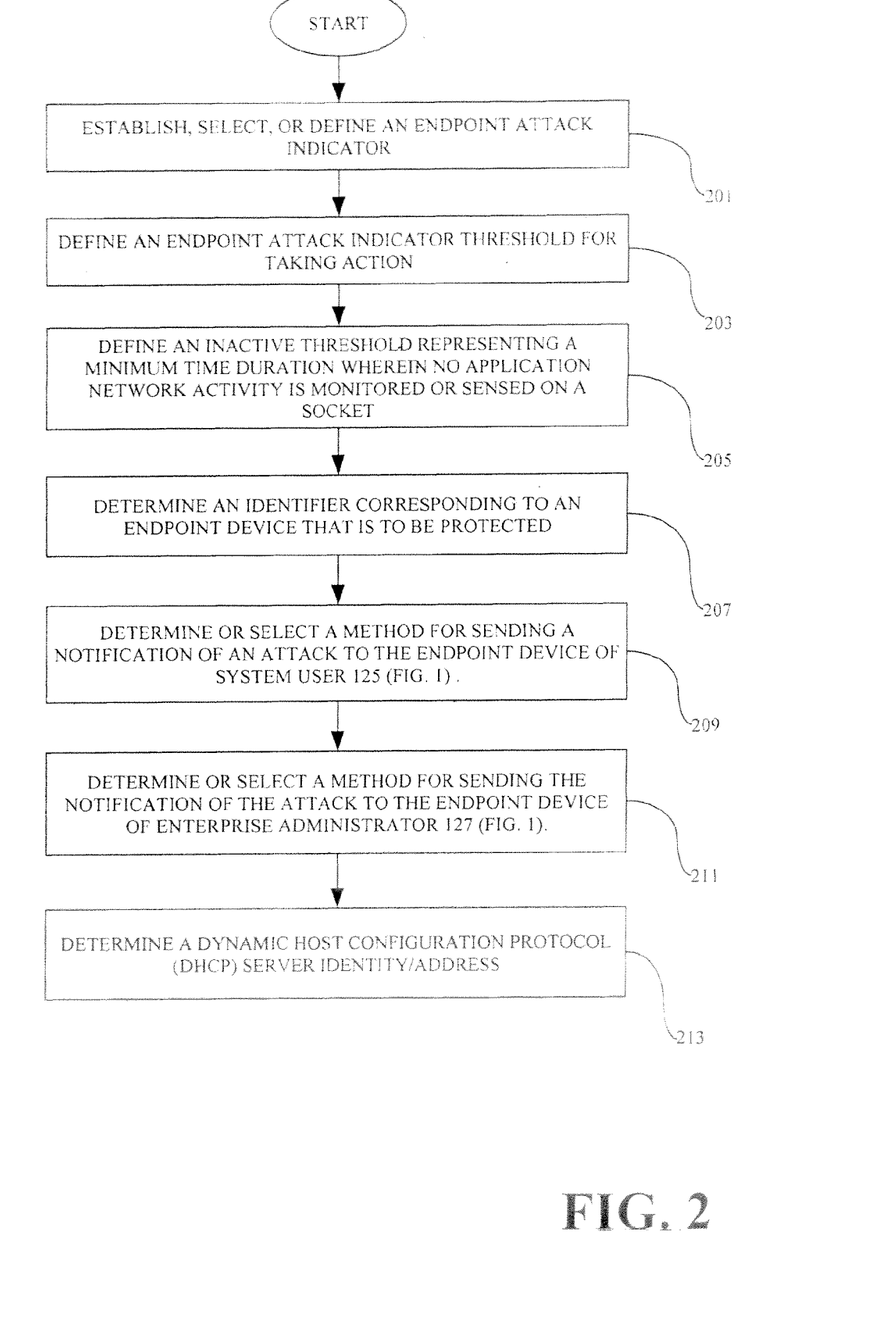
FIG. 2 is a flowchart illustrating the performance of a second exemplary set of methods to be performed by the exemplary system architecture of FIG. 1.

FIG. 2 is a flowchart illustrating the performance of a second exemplary set of methods to be performed by the exemplary system architecture of FIG. 1. The operational sequence of FIG. 2 may be regarded as a preparation sequence that is performed prior to any of the methods described hereinafter with reference to FIGS. 3-5. Returning now to FIG. 2, an endpoint attack indicator is established, selected, or defined (block 201). This step may be performed, for example, by instructing the endpoint attack indication system 113 (FIG. 1) to monitor or sense one or more parameters that are indicative of a cyber attack. These one or more parameters may be related to host based intrusion detection, network-based intrusion detection, boundary device detection, or external-to-organization security attack intelligence information.

Next, an endpoint attack indicator threshold for taking action is defined (block 203). This threshold is defined in accordance with the particular one or more parameters that were established, selected, or defined at block 201. For example, an illustrative endpoint attack indicator may be established at block 201 in terms of a number or quantity of attempted cyber attacks per unit time, such as per hour. At block 203, a threshold number of attacks may be defined as, for example, three attempted cyber attacks per hour. This threshold number is only mentioned for purposes of illustration, as a greater or lesser number of attacks could be used to define the threshold. At block 205, an inactive threshold is defined (to be described in greater detail hereinafter with reference to FIG. 5). The inactive threshold represents a time duration for which no application network activity is monitored or sensed on a socket. An identifier corresponding to an endpoint device that is to be protected is determined (block 207). Next, at block 209, a method for sending a notification of an attack to the endpoint device of system user 125 (FIG. 1) is determined or selected. A method for sending the notification of the attack to the endpoint device of enterprise administrator 127 (FIG. 1) is determined or selected (see FIG. 2, block 211). A dynamic host configuration protocol (DHCP) server identity/address is then determined (block 213).

Figure 3:
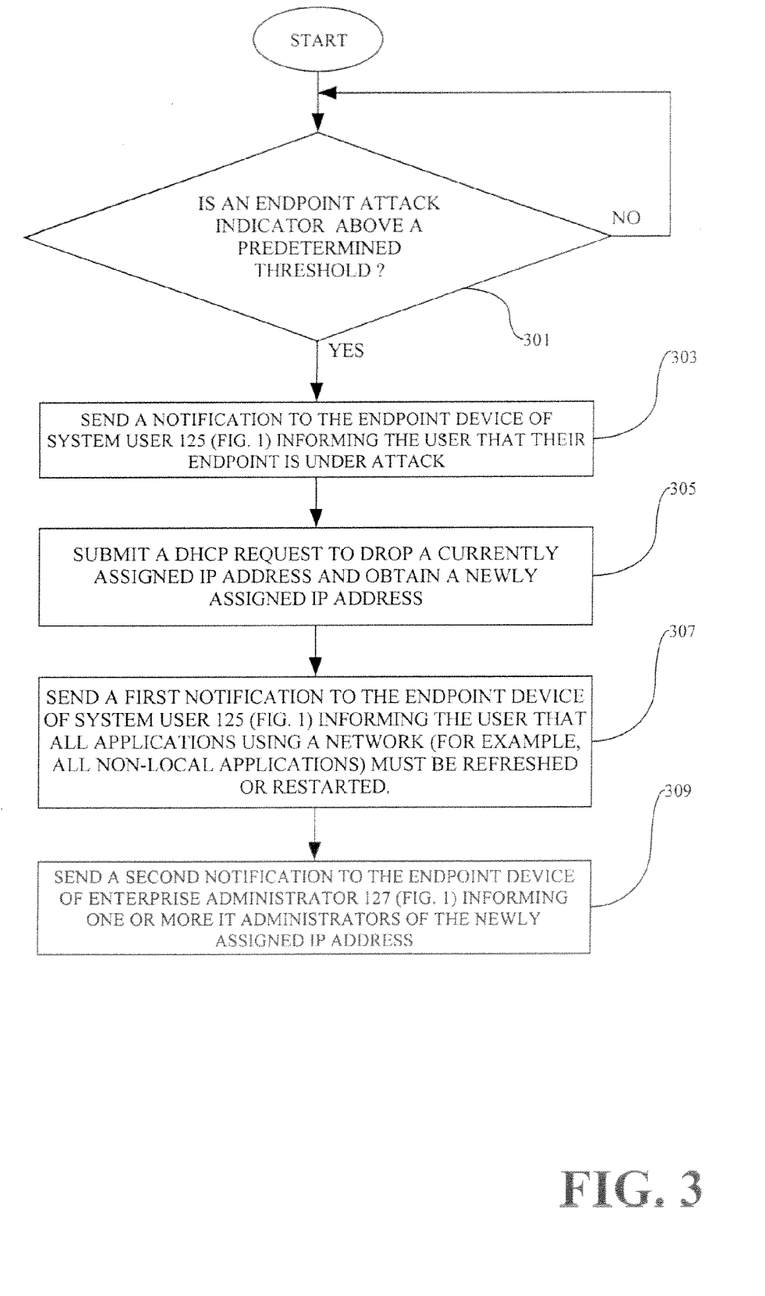
FIG. 3 is a flowchart illustrating the performance of a third exemplary set of methods to be performed by the exemplary system architecture of FIG. 1.

FIG. 3 is a flowchart illustrating the performance of a third exemplary set of methods to be performed by the exemplary system architecture of FIG. 1. Illustratively, the operational sequence of FIG. 3 may, but need not, commence after the execution of block 213 of FIG. 2. The method of FIG. 3 may be regarded as a brute-force embodiment for IP address change. At block 301, a test is performed to ascertain whether or not an endpoint attack indicator is above a predetermined threshold. If so, a notification is sent to the endpoint device of system user 125 (FIG. 1) informing the user that their endpoint is under attack (FIG. 3, block 303). Next, a DHCP request is submitted to drop a currently assigned IP address and obtain a newly assigned IP address (block 305). At block 307, a first notification is sent to the endpoint device of system user 125 (FIG. 1) informing the user that all applications using a network (for example, all non-local applications) must be refreshed or restarted. A second notification is sent to the endpoint device of enterprise administrator 127 informing one or more IT administrators of the newly assigned IP address (FIG. 3, block 309).

Figure 4:
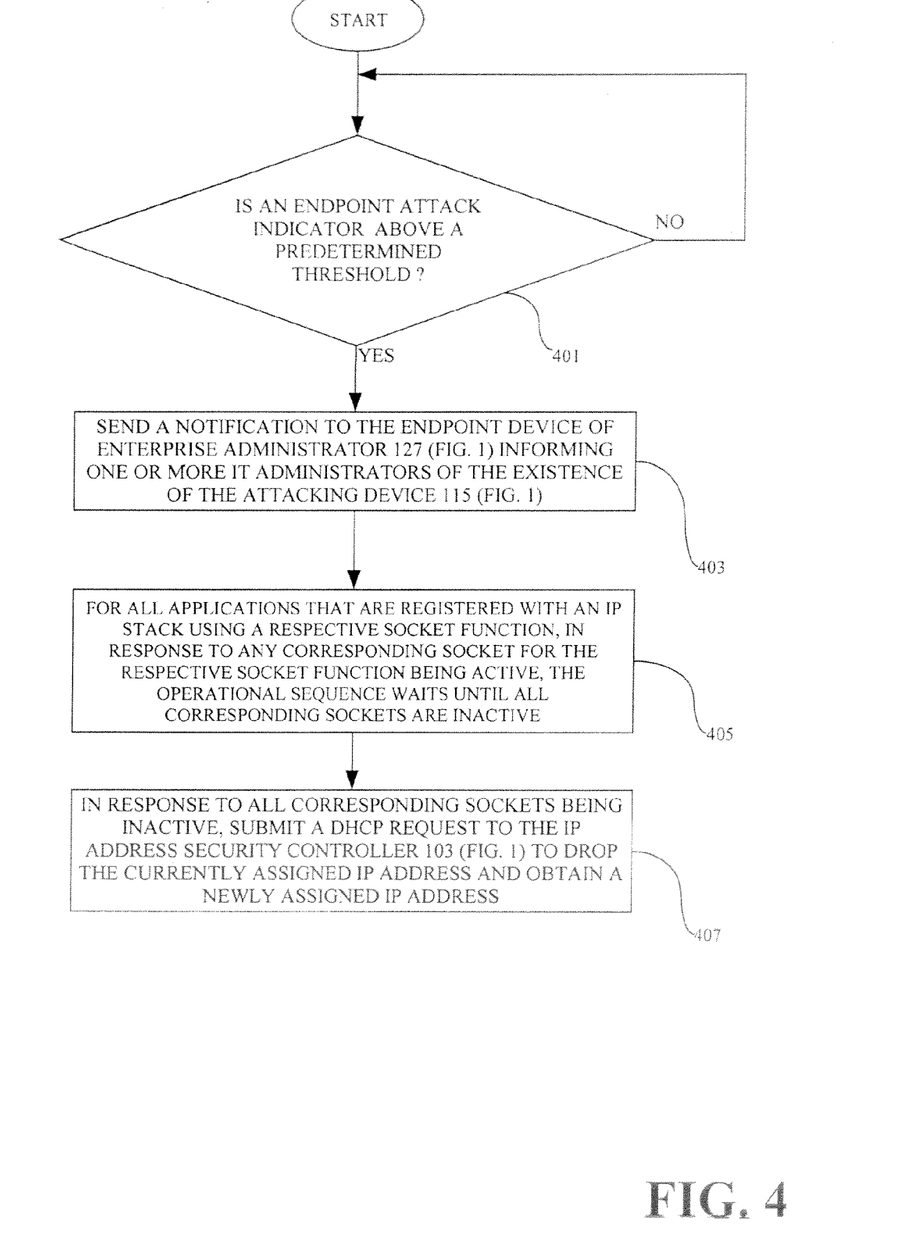
FIG. 4 is a flowchart illustrating the performance of a fourth exemplary set of methods to be performed by the exemplary system architecture of FIG. 1.

FIG. 4 is a flowchart illustrating the performance of a fourth exemplary set of methods to be performed by the exemplary system architecture of FIG. 1. Illustratively, the operational sequence of FIG. 4 may, but need not, commence after the execution of block 213 of FIG. 2. The method of FIG. 4 may be regarded as a graceful embodiment for IP address change where the IP address is not changed unless all socket functions for all applications registered with an IP stack are inactive. At block 401, a test is performed to ascertain whether or not an endpoint attack indicator is above a predetermined threshold. If so, a notification is sent to the endpoint device of enterprise administrator 127 (FIG. 1) informing one or more IT administrators of the existence of the attacking device 115 (FIG. 4, block 403). Then, for all applications that are registered with an IP stack using a respective socket function, in response to any corresponding socket for the respective socket function being active, the operational sequence waits until all corresponding sockets are inactive (block 405). In response to all corresponding sockets being inactive, a DHCP request is submitted to the IP address security controller 103 (FIG. 1) to drop the currently assigned IP address and obtain a newly assigned IP address (FIG. 4, block 407).

Figure 5:
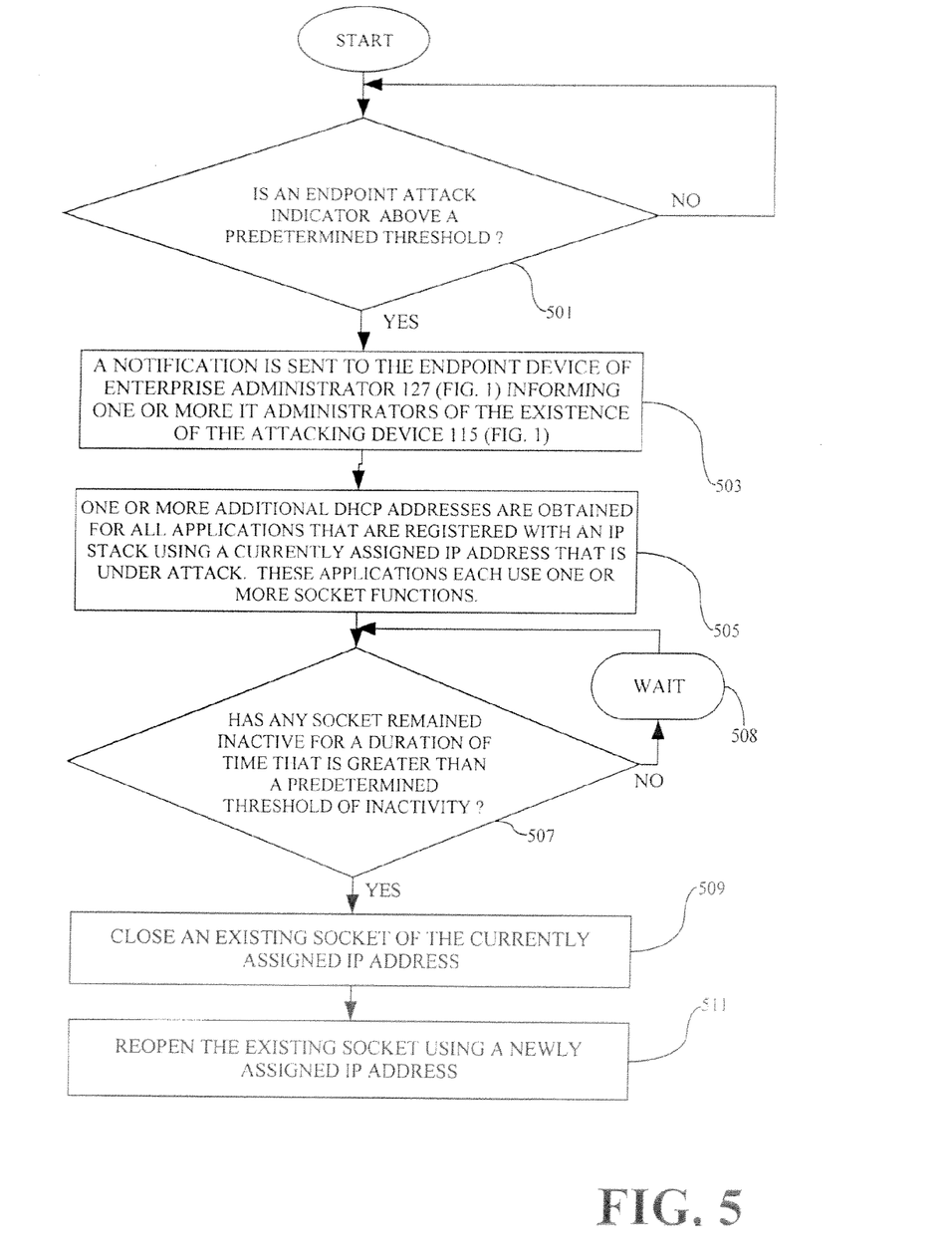
FIG. 5 is a flowchart illustrating the performance of a fifth exemplary set of methods to be performed by the exemplary system architecture of FIG. 1.

FIG. 5 is a flowchart illustrating the performance of a fifth exemplary set of methods to be performed by the exemplary system architecture of FIG. 1. Illustratively, the operational sequence of FIG. 5 may, but need not, commence after the execution of block 213 of FIG. 2. The illustrative embodiment of FIG. 5 performs changing of an IP address from a currently assigned IP address to a newly assigned IP address in response to each of one or more applications ending. The changing of the IP address may, but need not, be performed every time that an application ends. The changing of IP address is implemented by running two IP stacks concurrently.

The operational sequence of FIG. 5 commences at block 501 where a test is performed to ascertain whether or not an endpoint attack indicator is above a predetermined threshold. If so, a notification is sent to the endpoint device of enterprise administrator 127 (FIG. 1) informing one or more IT administrators of the existence of the attacking device 115 (FIG. 5, block 503). Next, at block 505, one or more additional DHCP addresses are obtained for all applications that are registered with an IP stack using a currently assigned IP address that is under attack. These applications each use one or more socket functions.

At block 507, a test is performed to ascertain whether or not any socket has remained inactive for a duration of time that is greater than a predetermined threshold of inactivity. If so, then an existing socket of the currently assigned IP address is closed (block 509). The existing socket is then reopened using a newly assigned IP address (block 511). The negative branch from block 507 leads to block 508 where the operational sequence waits for a predetermined or indefinite period of time after which the test of block 507 is performed again.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable storage medium does not include a propagating wave.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a pro use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which imp the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

What is claimed is:

1. A method comprising:
    determining a measurement of a cyber attack activity directed to a currently assigned Internet Protocol (IP) stack and address of a computer;
    determining whether the measurement of the cyber attack activity meets a threshold; and
    in response to determining that the measurement of the cyber attack activity meets the threshold:
        receiving a newly assigned IP stack and address for the computer;
        changing the currently assigned IP stack and address to the newly assigned IP stack and address; and
        assigning the newly assigned IP stack and address to one or more of a plurality of individual applications running on the computer.

2. The method of claim 1 wherein the newly assigned IP stack and address conforms to one or more of IPv4 or IPv6.

3. The method of claim 1 further comprising selecting the newly assigned IP stack and address using a random selection process from a pool of available and least recently used IP stacks and addresses.

4. The method of claim 1 further comprising detecting one or more cyber attacks, and measuring an intensity for each of the one or more detected cyber attacks by detecting a number of probing actions per unit time for each of the one or more detected cyber attacks, wherein the measurement comprises the number of cyber attacks.

5. The method of claim 1 further comprising the computer performing a handshaking procedure with a network administrator node wherein the handshaking procedure includes detecting the cyber attack, sending a message to a network administrator node, and receiving the newly assigned IP stack and address from a Dynamic Host Configuration Protocol server in response to the message.

6. The method of claim 5 wherein, upon receiving the newly assigned IP stack and address, the computer performs a transition of one or more applications resident on the computer to conform to the newly assigned IP address of the IP stack.

7. The method of claim 6 wherein the transition comprises terminating the currently assigned IP stack and address and activating the newly assigned IP stack and address,
    wherein determining a measurement of the cyber attack activity comprises monitoring a rate of aggregate information flow by one or more applications on the computer using the currently assigned IP stack and address, and wherein the method comprises, in response to the rate of aggregate information flow falling below a predetermined threshold rate of aggregate information flow, assigning the newly assigned IP stack and address to the computer.

8. The method of claim 6 wherein determining whether the measurement of the cyber attack activity meets the threshold comprises monitoring a rate of application flow for each of the plurality of individual applications using the currently assigned IP stack and address by one or more applications running on the computer, and wherein the method comprises, in response to a rate of information flow for one or more of the plurality of individual applications falling below a threshold rate, assigning the newly assigned IP stack and address to the one or more of the plurality of individual applications.

9. An apparatus comprising at least one processor and a memory storing a set of computer instructions, in which the processor and the memory storing the computer instructions are configured to cause the apparatus to perform:
determining a measurement of a cyber attack activity directed to a currently assigned Internet Protocol (IP) stack and address of the apparatus;
determining whether the measurement of the cyber attack activity meets a threshold; and
receiving a newly assigned IP stack and address for the apparatus in response to determining that the measurement of the cyber attack activity meets the threshold;
changing the currently assigned IP stack and address to the newly assigned IP stack and address in response to determining that the measurement of the cyber attack activity meets the threshold; and
assigning the newly assigned IP stack and address to one or more of a plurality of individual applications running on the computer.

10. The apparatus of claim 9 wherein the newly assigned IP stack and address conforms to one or more IPv4 or IPv6.

11. The apparatus of claim 9 further comprising selecting the newly assigned IP stack and address using a random selection process from a pool of available and least recently used IP stacks and addresses.

12. The apparatus of claim 9 further comprising detecting one or more cyber attacks, and measuring an intensity for each of the one or more detected cyber attacks by detecting a number of probing actions per unit time for each of the one or more detected cyber attacks, wherein the measurement comprises the number of cyber attacks.

13. The apparatus of claim 9 wherein the processor and the memory storing the computer instructions are further configured to cause the apparatus to perform a handshaking procedure with a network administrator node wherein the handshaking procedure includes detecting the cyber attack, sending a message to a network administrator node, and receiving the newly assigned IP stack and address from a Dynamic Host Configuration Protocol server in response to the message.

14. The apparatus of claim 13 wherein, upon receiving the newly assigned IP stack and address, the apparatus performs a transition of one or more applications resident on the apparatus to conform to the newly assigned IP stack and address.

15. The apparatus of claim 14 wherein the transition comprises terminating the currently assigned IP stack and address and activating the newly assigned IP stack and address, wherein determining a measurement of the cyber attack activity comprises monitoring a rate of aggregate information flow by one or more applications on the apparatus using the currently assigned IP stack and address, and wherein the computer instructions are configured to cause the apparatus to perform assigning the newly assigned IP stack and address to the apparatus in response to the rate of aggregate information flow falling below a predetermined threshold rate of aggregate information flow.

16. The apparatus of claim 14 wherein determining whether the measurement of the cyber attack activity meets the threshold comprises monitoring a rate of application flow for each of the plurality of individual applications using the currently assigned IP stack and address by one or more applications running on the apparatus, and wherein the computer instructions are configured to cause the apparatus to perform, in response to a rate of information flow for one or more of the plurality of individual applications falling below a threshold rate, assigning the newly assigned IP stack and address to the one or more of the plurality of individual applications.

17. A non-transitory computer readable memory encoded with a computer program comprising computer readable instructions recorded thereon for execution of a method comprising:
determining a measurement of a cyber attack activity directed to a currently assigned Internet Protocol (IP) stack and address of a computer;
determining whether the measurement of the cyber attack activity meets a threshold; and
in response to determining that the measurement of the cyber attack activity meets the threshold:
receiving a newly assigned IP stack and address for the computer;
changing the currently assigned IP stack and address to the newly assigned IP stack and address; and
assigning the newly assigned IP stack and address to one or more of a plurality of individual applications running on the computer.

18. The non-transitory computer readable memory of claim 17 wherein the newly assigned IP stack and address conforms to one or more of IPv4 or IPv6.

19. The non-transitory computer readable memory of claim 17 further comprising instructions for selecting the newly assigned IP stack and address using a random selection process from a pool of available and least recently used IP stacks and addresses.

20. The non-transitory computer readable memory of claim 17 further comprising instructions for detecting one or more cyber attacks, and measuring an intensity for each of the one or more detected cyber attacks by detecting a number of probing actions per unit time for each of the one or more detected cyber attacks, wherein the measurement comprises the number of cyber attacks.

21. The non-transitory computer readable memory of claim 17 further comprising instructions for the computer to perform a handshaking procedure with a network administrator node wherein the handshaking procedure includes detecting the cyber attack, sending a message to a network administrator node, and receiving the newly assigned IP stack and address from the Dynamic Host Configuration Protocol server in response to the message.

22. The non-transitory computer readable memory of claim 21 further comprising instructions wherein, upon receiving the newly assigned IP stack and address, the computer performs a transition of the one or more applications resident on the computer to conform to the newly assigned IP stack and address.

23. The non-transitory computer readable memory of claim 22 further comprising instructions for performing the transition wherein the transition comprises terminating the currently assigned IP stack and address and activating the newly assigned IP stack and address,
   wherein determining a measurement of the cyber attack activity comprises monitoring a rate of aggregate information flow by the one or more applications on the computer using the currently assigned IP stack and address, and
   wherein the method comprises, in response to the rate of aggregate information flow falling below a predetermined threshold rate of aggregate information flow, assigning the newly assigned IP stack and address to the computer.

24. The non-transitory computer readable memory of claim 22, wherein determining whether the measurement of the cyber attack activity meets the threshold comprises monitoring a rate of application flow for each of a plurality of individual applications using the currently assigned IP stack and address by the one or more applications running on the computer, and
   wherein the method comprises, in response to a rate of information flow for one or more of the plurality of individual applications falling below a threshold rate, assigning the newly assigned IP stack and address to the one or more of the plurality of individual applications.

* * * * *